(12) United States Patent
Alameh et al.

(10) Patent No.: US 9,525,770 B2
(45) Date of Patent: Dec. 20, 2016

(54) PORTABLE ELECTRONIC DEVICE WITH DUAL, DIAGONAL PROXIMITY SENSORS AND MODE SWITCHING FUNCTIONALITY

(71) Applicant: Google Technology Holdings LLC, Mountain View, CA (US)

(72) Inventors: Rachid M. Alameh, Crystal Lake, IL (US); Gregory S. Meiste, Lindenhurst, IL (US); Andrew K. Wells, Lindenhurst, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 308 days.

(21) Appl. No.: 14/279,404

(22) Filed: May 16, 2014

(65) Prior Publication Data

US 2015/0281428 A1    Oct. 1, 2015

Related U.S. Application Data

(60) Provisional application No. 61/970,418, filed on Mar. 26, 2014.

(51) Int. Cl.
| | |
|---|---|
| *H04M 1/00* | (2006.01) |
| *H04M 1/725* | (2006.01) |
| *G06F 1/32* | (2006.01) |
| *H04W 52/02* | (2009.01) |

(52) U.S. Cl.
CPC ........ *H04M 1/72569* (2013.01); *G06F 1/3231* (2013.01); *H04W 52/0254* (2013.01); *G06F 1/3265* (2013.01)

(58) Field of Classification Search
CPC ..................... H04M 1/72569; H04W 52/0254; G06F 1/3231; G06F 1/3265
USPC .................................................. 345/156–179
See application file for complete search history.

(56) References Cited

U.S. PATENT DOCUMENTS

| | | | |
|---|---|---|---|
| 8,275,412 | B2 | 9/2012 | Alameh et al. |
| 2010/0167783 | A1* | 7/2010 | Alameh .............. H04M 1/0202 455/556.1 |
| 2010/0294938 | A1* | 11/2010 | Alameh ................ G06F 3/0308 250/342 |
| 2011/0312349 | A1 | 12/2011 | Forutanpour et al. |
| 2015/0001414 | A1* | 1/2015 | Morita ................... G01B 11/14 250/393 |

* cited by examiner

*Primary Examiner* — Amit Chatly
(74) *Attorney, Agent, or Firm* — Morris & Kamlay LLP

(57) ABSTRACT

An electronic device (100) includes a housing (127,128) having a front major face, a rear major face, a first side edge (201), and a second side edge 202. A display (102) is disposed along the front major face. At least three proximity sensor components (203,204,205), operable with one or more processors (116), are disposed along the front major face and arranged to define a line (206) that is diagonal to one or more of the first side edge and the second side edge. Also, at least three additional proximity sensor components (303,304,305) are disposed along the rear major face and arranged to define another line (306) diagonal to one or more of the first side edge and the second side edge.

20 Claims, 7 Drawing Sheets

PORTABLE ELECTRONIC DEVICE WITH DUAL, DIAGONAL PROXIMITY SENSORS AND MODE SWITCHING FUNCTIONALITY

CROSS REFERENCE TO PRIOR APPLICATIONS

This application claims priority and benefit under 35 U.S.C. §119(e) from U.S. Provisional Application No. 61/970,418, filed Mar. 26, 2014.

BACKGROUND

Technical Field

This disclosure relates generally to electronic devices, and more particularly to portable electronic devices having proximity sensors.

Background Art

Proximity sensors detect the presence of nearby objects before those objects contact the device in which the proximity sensors are disposed. Illustrating by example, some proximity sensors emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor.

Electronic devices employ proximity sensors to manage power consumption of audio and video devices. For example, a proximity sensor may detect a device, is proximately located with a user's face and disable the display to save power. In another example, when a device determines that a user's face is proximately located with the device, the device may reduce speaker volume so as not to over stimulate the user's eardrums. As another example, the proximity sensor may turn off the device display when the device is positioned near the user's ear to save power. Thus, these types of wireless communication device dynamically adjust the operation of audio and video output components when these components are positioned very close to, i.e., adjacent to, a user's ear. It would be advantageous to have other uses for proximity sensors in electronic devices.

Figure 1:
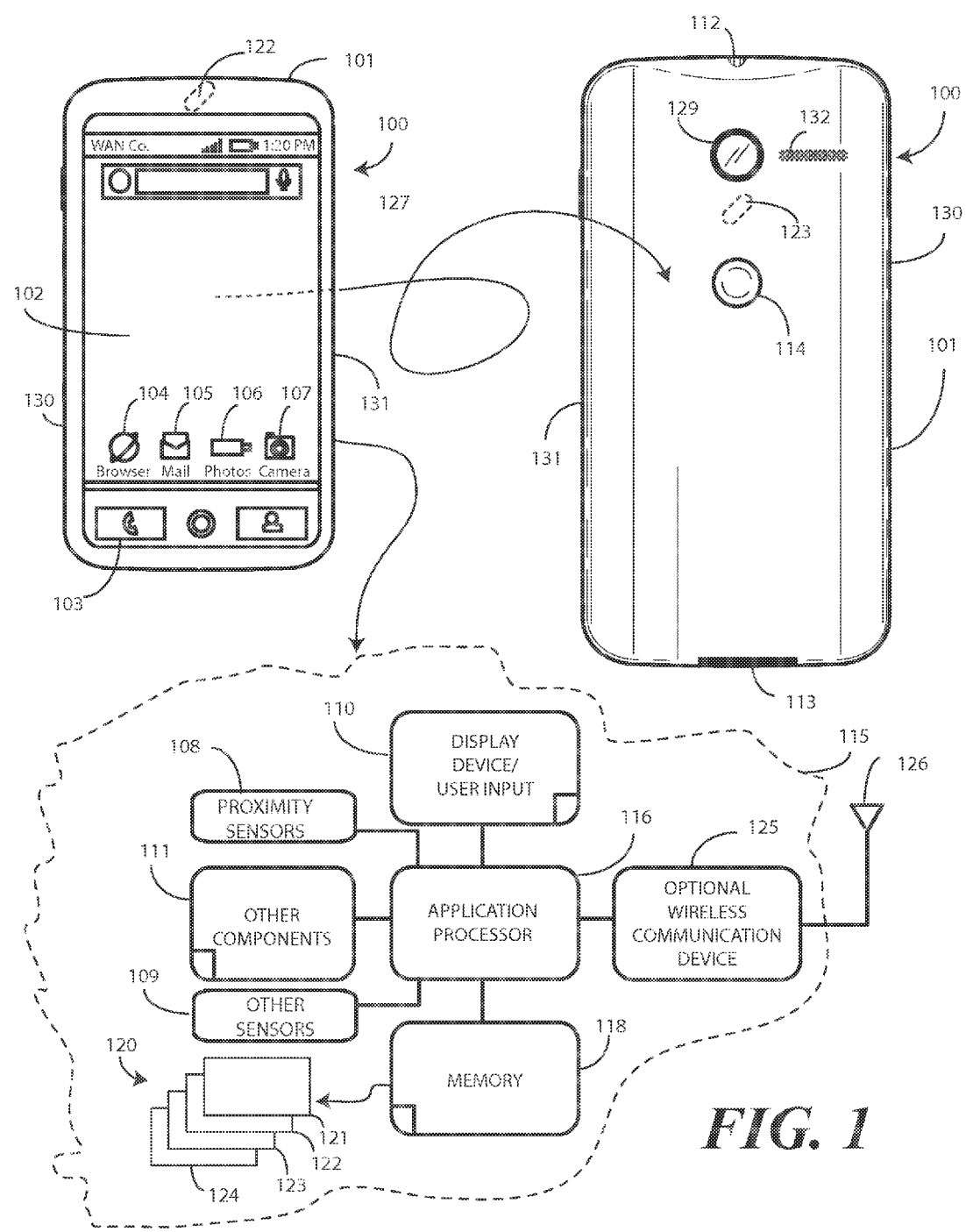
FIG. 1 illustrates one explanatory portable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using proximity sensor components to control modes of operation of an electronic device. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling proximity sensors to control device operation as described herein. The non-processor circuits may include, but are not limited to, a radio receiver, a radio transmitter, signal drivers, clock circuits, power source circuits, and user input devices. As such, these functions may be interpreted as steps of a method to perform device control in response to one or more proximity sensors components. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a portable electronic device having a housing. The housing includes a front major face, a rear major face, a first side edge, and a second side edge. In one embodiment, a display is disposed along the front major face. One or more processors are operable with the display.

In one embodiment, the portable electronic device has two sets of proximity sensor components. A first set of proximity sensor components is disposed along the front major face, while a second set of proximity sensor components is disposed along the rear major face. In one embodiment, each set of proximity sensor components includes at least three proximity sensor components. The three proximity sensor components can be two signal receivers and one signal transmitter or, alternatively, can be two signal transmitters and one signal receiver.

In one or more embodiments, the three proximity sensor components of each set of proximity sensor components are disposed along their respective major face to define a line that is diagonal to one of the edges of the portable electronic device. For example, at least three proximity sensor components can be disposed along the front major face and arranged to define a line that is diagonal to one or more of the first side edge and the second side edge. Similarly, at least three additional proximity sensor components can be disposed along the rear major face and arranged to define another line that is also diagonal to one or more of the first side edge and the second side edge.

Advantageously, this diagonal placement of the 2-signal emitters and 1-signal receiver or the 2-signal receivers and 1-signal emitter helps the proximity sensor component set to overcome the issue of "blind" spots in which areas are defined where a proximity sensor has trouble detecting the proximity of dark object in contact with sensor. The use of at least three proximity sensor components, arranged in a line that is diagonal to one or more sides of the device reduces the number and size of blind spots in comparison to prior art designs. This reduction of blind spots advantageously provides more reliable object detection with the proximity sensor components.

Advantageously, the placement of the sets of proximity sensor components on both the front major face and the rear major face allows a portable device to be used from either side. For example, where the portable electronic device is a portable electronic communication device, with embodiments of the disclosure a person can take a telephone call holding the front major face of the device against their head or, alternatively, by holding the rear major face against their head. Depending upon which set of proximity sensors components is triggered, components on the corresponding major face can be disabled while the set of proximity sensor components disposed on the other side are used for device control.

Illustrating by example, presume a user hears a portable electronic communication device configured in accordance with one or more embodiments of the disclosure ring due to an incoming call. If the user grabs the device and places the rear major face against their head, the set of proximity sensor components disposed on the rear major face are triggered. Touch sensitive surfaces, buttons, controls, or other devices along the rear major face can be disabled (audio components such as transducers and microphones may remain active). At the same time, the set of proximity sensor components disposed along the front major face can then be used for device control. For instance, the user may be able to control volume of the telephone call by making gestures across the front major face, with those gestures being detected by the set of proximity sensor components.

The diagonal placement of those components advantageously turns the set of proximity sensor components into a five-way navigation device. The set of proximity sensor components can thus effectively serve as a miniature joystick control. If the user decides to turn the device over, i.e., with the front major face against the head, the operation and control can reverse, with the display being deactivated and the set of proximity sensor components disposed along the rear major face transitioning into a user input device. During the call, the user can adjust volume, for example, by sliding a finger up and down around the set of proximity sensor components. At the same time, the user may perform another operation by sliding the finger left and right since the diagonal placement of the proximity sensor components allows for four-direction control.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member 127 is disposed about the periphery of the display 102. Said differently, the display 102 is disposed along a front major face of the front housing member 127 in one embodiment. A rear-housing member 128 forms the backside of the electronic device 100 in this illustrative embodiment and defines a rear major face of the electronic device. Features can be incorporated into the housing members 127,128.

Examples of such features include an optional camera 129 or an optional speaker port 132, which are show disposed on the rear major face of the electronic device 100 in this embodiment. In this illustrative embodiment, a user interface component 114, which may be a button or touch sensitive surface, can also be disposed along the rear-housing member 128.

In one embodiment, the electronic device 100 includes one or more connectors 112,113, which can include an analog connector, a digital connector, or combinations thereof. In this illustrative embodiment, connector 112 is an analog connector disposed on a first edge, i.e., the top edge, of the electronic device 100, while connector 113 is a digital connector disposed on a second edge opposite the first edge, which is the bottom edge in this embodiment.

A block diagram schematic 115 of the electronic device 100 is also shown in FIG. 1. In one embodiment, the electronic device 100 includes one or more processors 116. In one embodiment, the one or more control circuit can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable to present presentation information, such as images, text, and video, on the display 102. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel, one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a photo application 106 configured to permit the user to view images or video on the display 102 of electronic device 100, and a camera application 107 configured to capture still (and optionally video) images. These applications are illustrative only, as others will be obvious to one of ordinary skill in the art having the benefit of this disclosure.

In one or more embodiments, the one or more processors 116 are responsible for managing the applications and all secure information of the electronic device 100. The one or more processors 116 can also be responsible for launching, monitoring and killing the various applications and the various application service modules. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 116 may generate commands based on information received from one or more proximity sensors 108 and one or more other sensors 109. The one or more processors 116 may process the received information alone or in combination with other data, such as the information stored in the memory 118. For example, the one or more processors 116 may retrieve information the memory 118 to calibrate the sensitivity of the one or more proximity sensors 108 and one or more other sensors 109.

The input devices 110 may include a video input component such as an optical sensor, an audio input component such as a microphone, and a mechanical input component such as button or key selection sensors, touch pad sensor, touch screen sensor, capacitive sensor, motion sensor, and switch. Similarly, the other components 111 can include output components such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms.

In one embodiment, the proximity sensors 108 can include at least two sets 122,123 of proximity sensors components. For example, a first set 122 of proximity sensor components can be disposed on the front major face of the electronic device 100, while another set 123 of proximity sensor components can be disposed on the rear major face of the electronic device 100. In one embodiment each set 122,123 of proximity sensor components comprises at least three proximity sensor components. In one embodiment, the three proximity sensor components comprise a first component, a second component, and a third component. In one embodiment, the second component is disposed between the first component and the third component, with the second component being a different component type from the first component and the third component. For example, the first component and the third component can be one of a signal emitter or a signal receiver, while the second component another of the signal emitter or the signal receiver. Thus, the three proximity sensor components can be arranged emitter-receiver-emitter or receiver-emitter-receiver in one or more embodiments.

Each proximity sensor component can be one of various types of proximity sensors, such as but not limited to, capacitive, magnetic, inductive, optical/photoelectric, laser, acoustic/sonic, radar-based, Doppler-based, thermal, and radiation-based proximity sensors. For example, each set 122,123 of proximity sensor components be an infrared proximity sensor set that uses a signal emitter that transmits a beam of infrared (IR) light, and then computes the distance to any nearby objects from characteristics of the returned, reflected signal. The returned signal may be detected using a signal receiver, such as an IR photodiode to detect reflected light emitting diode (LED) light, responding to modulated IR signals, and/or triangulation.

The other components 111 may include, but are not limited to, accelerometers, touch sensors, surface/housing capacitive sensors, audio sensors, and video sensors (such as a camera). For example, an accelerometer may be embedded in the electronic circuitry of the electronic device 100 to show vertical orientation, constant tilt and/or whether the device is stationary. Touch sensors may used to indicate whether the device is being touched at side edges 130,131, thus indicating whether or not certain orientations or movements are intentional by the user.

Other components of the electronic device can include a device interface to provide a direct connection to auxiliary components or accessories for additional or enhanced functionality and a power source, such as a portable battery, for providing power to the other internal components and allow portability of the electronic device 100.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
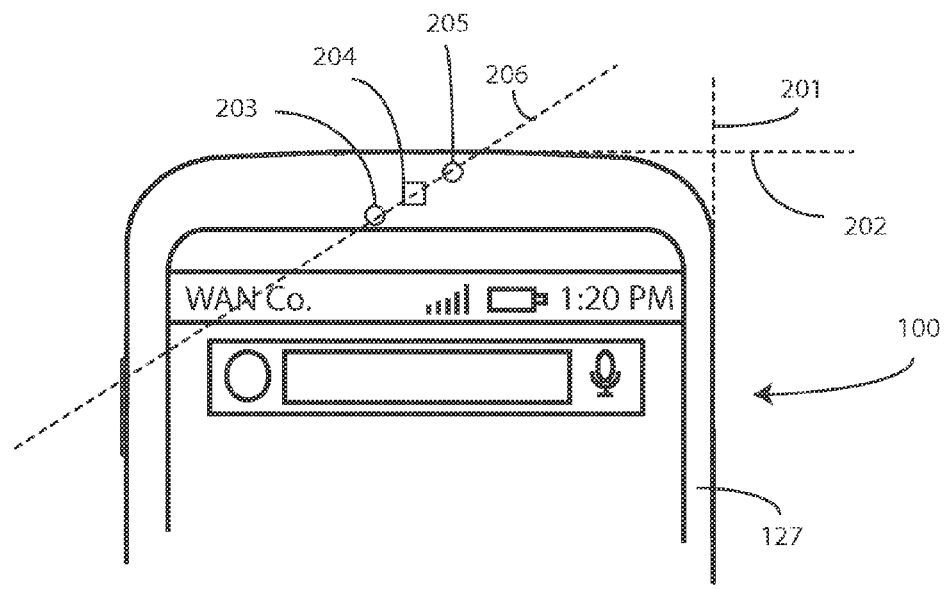
FIG. 2 illustrates a front portion of one explanatory portable electronic device in accordance with one or more embodiments of the disclosure.

Turning now to FIG. 2, illustrated therein is front portion of one explanatory portable electronic 100 device in accordance with one or more embodiments of the disclosure. The portion shown in FIG. 2 is a portion of the front major face defined by the housing 127 of the electronic device 100. The housing 127 defines at least a first side edge 201 and a second side edge 202.

As shown in FIG. 2, in one embodiment the electronic device 100 includes at least three proximity sensor components 203,204,205. In one embodiment, the three proximity sensor components 203,204,205 are disposed along the front major face and arranged to define a line 206. In one embodiment, the line 206 is diagonal to one or more of the first side edge 201 and the second side edge 202. In this illustrative embodiment, the line 206 is diagonal by about forty-five degrees relative to each of the first side edge 201 and the second side edge 202. This angle is illustrative only, as others will be obvious to those of ordinary skill in the art having the benefit of this disclosure. Moreover, other angles may be better suited for other applications. For example, if the electronic device 100 is a long, thin rectangle, one angle may be preferred. By contrast, is the electronic device 100 is more like a square, another angle may be preferred. Additionally, the angle may be based upon the location of the proximity sensor components 203,204,205 as well. For example, if the proximity sensor components 203,204,205 are closer to the first side edge 201 than the second side edge 202, a different angle may be desired. As noted above, the diagonal orientation of the line 206 relative to the first side edge 201 and the second side edge 202 provides two distinct advantages over prior art designs: the elimination of blind spots and the ability to use the three proximity sensor components 203,204,205 as a multi-dimensional navigation control.

In one embodiment, the proximity sensor components 203,204,205 comprise a first signal emitter, a second signal emitter, and a signal receiver, where the signal receiver is disposed between the first signal emitter and the second signal emitter. Thus, proximity sensor component 203 and proximity sensor component 205 could be signal emitters in one or more embodiments, with proximity sensor component 204 being a signal receiver. In another embodiment, the proximity sensor components 203,204,205 comprise a first signal receiver, a second signal receiver, and a signal emitter, where the signal emitter is disposed between the first signal receiver and the second signal receiver. Thus, proximity sensor component 203 and proximity sensor component 205 could be signal receivers in one or more embodiments, with proximity sensor component 204 being a signal emitter.

Where a signal emitter is disposed between two signal receivers, the one or more processors (116) of the electronic device 100, operating in conjunction with the proximity sensor components 203,204,205, can discern the location and movement of an object by comparing the strength of the signal received by each receiver. The object will be disposed closer to the receiver receiving the greater signal, with the exception of when one receiver receives a signal and the other does not. This latter situation indicates the object is disposed atop the receiver not receiving the signal, which is indicative of location as well. Where the signal receiver is disposed between the signal emitter, the one or more processors (116) can discern the location and a movement of an object by determining the relative amounts of each emitter's signal that is being received. In one embodiment, each emitter emits a signal using a time division-multiplexing signal. The receiver can thus identify signals from each emitter, determine which is being reflected more by the object, and accordingly determine location and movement of the object. This comparison of signal strengths is not possible with a single emitter-receiver pair.

Additionally, the diagonal placement of the proximity sensor components 203,204,205 advantageously allows movement in multiple directions to be detected. Accordingly, a user can move a finger or other object along the front surface of the electronic device 100 in multiple dimensions, each of which is sensed by the proximity sensor components 203,204,205. This is true because movement in the upward direction, as viewed in FIG. 2, will cause the object to interact with proximity sensor component 203 first, followed by proximity sensor component 204 and then proximity sensor component 205. Movement to the right, as viewed in FIG. 2, will cause the object to interact with the proximity sensor components 203,204,205 in the same order. By contrast, movement to the left will cause the object to interact with proximity sensor component 205 first, followed by proximity sensor component 204 and then proximity sensor component 203. The same is true for movement downward. Accordingly, this sequence of interaction between the proximity sensor components 203,204,205 allows the proximity sensor components 203,204,205 to function as a five-way navigation device. Motion in four directions can be detected as described, and a fifth action of "tapping" the proximity sensor components 203,204,205 can be detected when all three proximity sensor components 203,204,205 are being covered or otherwise interacted with by the object. In this fashion, the proximity sensor components 203,204,205 can function in the same manner as a miniature joystick control, yet without the need for apertures and mechanical devices being disposed along the front surface of the electronic device 100.

Figure 3:
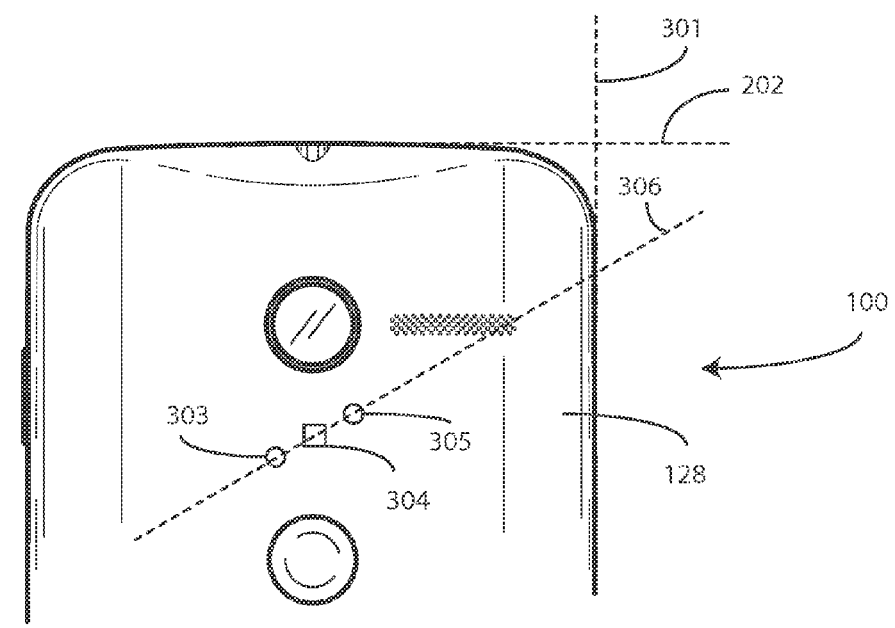
FIG. 3 illustrates a rear portion of one explanatory portable electronic device in accordance with one or more embodiments of the disclosure.

As noted above, one advantage of embodiments of the disclosure lies in the fact that, if the user decides to turn the device over, the operation and control can reverse. Turning now to FIG. 3, illustrated therein is rear portion of one explanatory portable electronic 100 device in accordance with one or more embodiments of the disclosure. The portion shown in FIG. 3 is a portion of the rear major face defined by the housing 128 of the electronic device 100. As with the front major face shown in FIG. 2, the housing 128 of FIG. 3 defines at least a first side edge 301 and a second side edge 202.

As with the embodiment of FIG. 2, in one embodiment the electronic device 100 includes at least three proximity sensor components 303,304,305 (which can include two transmitters and one receiver, or alternatively one transmitter and two receivers) disposed along the rear major face. In one embodiment, the three proximity sensor components 303,304,305 are arranged to define another line 306. In one embodiment, the line 306 is diagonal to one or more of the first side edge 201 and the second side edge 202. In this illustrative embodiment, the line 306 is diagonal by about forty-five degrees relative to each of the first side edge 301 and the second side edge 202. As noted above, the angle of the line 306 can change based upon application and/or placement of the proximity sensor components 303,304,305 along the rear major face. Accordingly, in one or more embodiments the angle is based upon a geometric form factor of the electronic device 100 and/or the placement of the proximity sensor components 303,304,305 on a major face of the electronic device 100.

In one embodiment, the proximity sensor components 303,304,305 comprise a first signal emitter, a second signal emitter, and a signal receiver, where the signal receiver is disposed between the first signal emitter and the second signal emitter. Thus, proximity sensor component 303 and proximity sensor component 305 could be signal emitters in one or more embodiments, with proximity sensor component 304 being a signal receiver. In another embodiment, the proximity sensor components 303,304,305 comprise a first signal receiver, a second signal receiver, and a signal emitter, where the signal emitter is disposed between the first signal receiver and the second signal receiver. Thus, proximity sensor component 303 and proximity sensor component 305 could be signal receivers in one or more embodiments, with proximity sensor component 304 being a signal emitter. The operation of the proximity sensor components 303,304,305 can occur in the same fashion described above with reference to FIG. 2.

Figure 4:
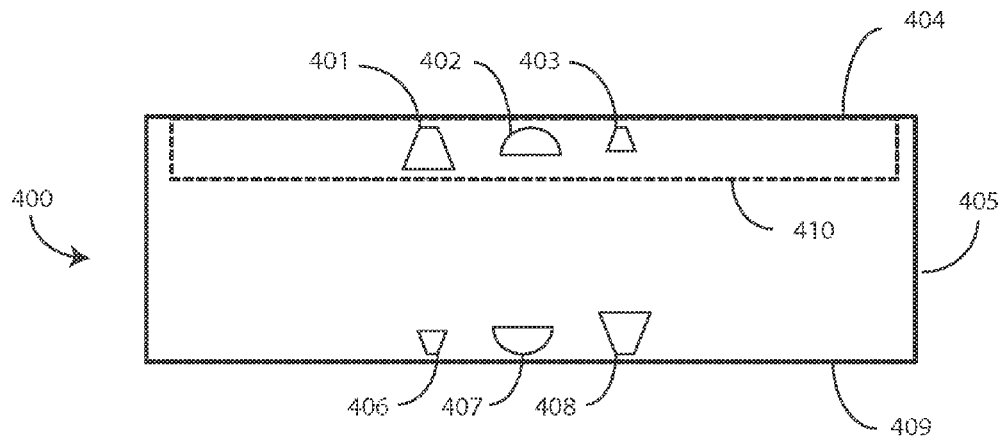
FIG. 4 illustrates a sectional view of one explanatory portable electronic device in accordance with one or more embodiments of the disclosure.
Figure 5:
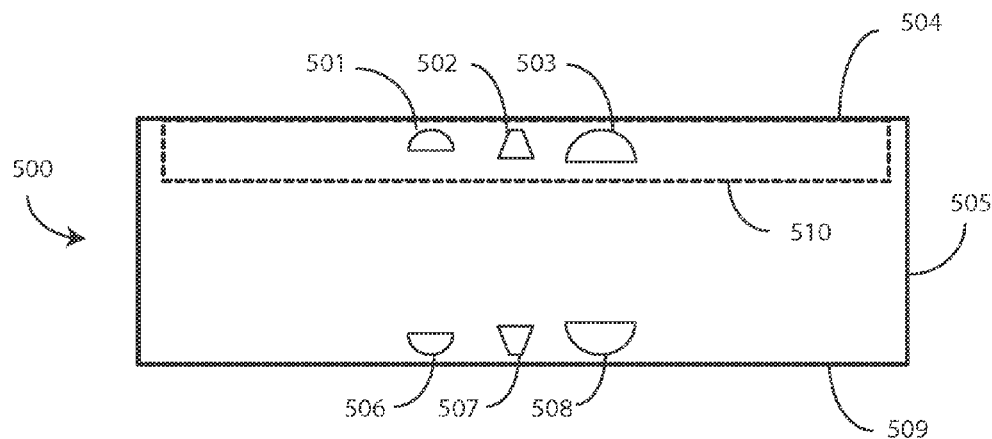
FIG. 5 illustrates a sectional view of another explanatory portable electronic device in accordance with one or more embodiments of the disclosure.
Figure 6:
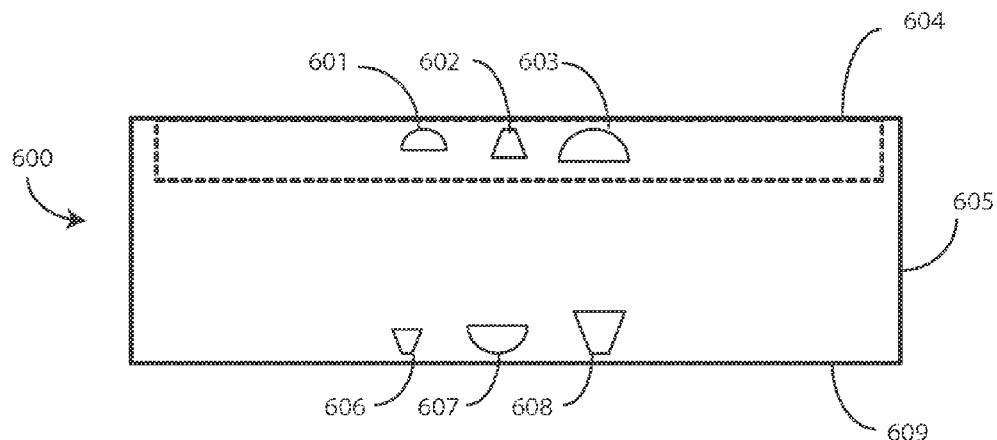
FIG. 6 illustrates a sectional view of another explanatory portable electronic device in accordance with one or more embodiments of the disclosure.

Turning now to FIGS. 4-6, illustrated therein are various examples of electronic devices 400,500,600 configured in accordance with one or more embodiments of the disclosure. Each electronic device 400,500,600 includes a display 410, 510,610. Each electronic device 400,500,600 includes at least three proximity sensors, e.g., proximity sensors 401, 402,403, disposed along a first major face 404,504,604 to define a line arranged diagonal relative to a side 505,605,605 of the electronic device 400,500,600, and at least three additional proximity sensors, e.g., proximity sensors 406, 407,408 disposed along a second major face 409,509,609 to define another line arranged diagonal relative to the side 405,505,605 of the electronic device 400,500,600. In one or more embodiments, each electronic device 400,500,600 is a portable electronic device. The proximity sensors 401,402, 403,406,407,408 can be used, in conjunction with one or more processors, to determine proximity of an object to one of the first major face 404,504,604 or the second major face 409,509,609.

The views of FIGS. 4-6 are looking from the top side edge of each electronic device 400,500,600 toward the bottom side edge. The relative placements of the proximity sensors are shown illustratively by size. Smaller components are disposed closer to the bottom side edge, while larger elements are disposed closer to the top side edge. Where the components are three different sizes, this is used to graphically indicate that the proximity sensors are arranged to define a line. The examples shown in FIGS. 4-6 are illustrative only, and are intended to show some of the many variations in which devices in accordance with embodiments of the disclosure can be constructed. Other variations will be obvious to those of ordinary skill in the art having the benefit of this disclosure.

In FIG. 4, proximity sensors 401,403 are signal emitters. Proximity sensor 402 is a signal receiver. Proximity sensor 402 is disposed between proximity sensors 401,403. Similarly, proximity sensors 406,408 are signal emitters, while proximity sensor 407 is a signal receiver. Proximity sensors 403,406 are disposed closer to the bottom side edge of the electronic device 400, while proximity sensors 401,408 are disposed closer to the top side edge of the electronic device 400. Thus, proximity sensors 401,402,403 define a line that is diagonal to the side 405 by moving into the page and to the right, while proximity sensors 406,407,408 define a line that is diagonal to the side 405 by moving into the page and to the left.

In FIG. 5, proximity sensors 501,503 are signal receivers. Proximity sensor 502 is a signal emitter. Proximity sensor 502 is disposed between proximity sensors 501,503. Similarly, proximity sensors 506,508 are signal receivers, while proximity sensor 507 is a signal emitter. Proximity sensors 501,506 are disposed closer to the bottom side edge of the electronic device 500, while proximity sensors 503,508 are disposed closer to the top side edge of the electronic device 500. Thus, proximity sensors 501,502,503 define a line that is diagonal to the side 505 by moving into the page and to the left. Similarly, proximity sensors 506,507,508 define a line that is diagonal to the side 505 by also moving into the page and to the left.

In FIG. 6, different mixes of sensor components are used. Proximity sensors 601,603 are signal receivers. Proximity sensor 602 is a signal emitter. Proximity sensor 602 is disposed between proximity sensors 601,603. To provide a contrasting arrangement on the second side 609, proximity sensors 606,608 are signal emitters, while proximity sensor 607 is a signal receiver. Proximity sensors 601,606 are disposed closer to the bottom side edge of the electronic device 600, while proximity sensors 603,608 are disposed closer to the top side edge of the electronic device 600. Thus, proximity sensors 601,602,603 define a line that is diagonal to the side 605 by moving into the page and to the left. Similarly, proximity sensors 606,607,608 define a line that is diagonal to the side 605 by also moving into the page and to the left.

Advantages beyond those offered by the placement and orientation of the various proximity sensor components can be obtained by operating the proximity sensor components in accordance with one or more methods. Turning now to FIG. 7-11, illustrated therein are various methods suitable for devices configured in accordance with one or more embodiments of the disclosure.

In one or more embodiments, the devices can be operated in multiple modes of operation. A first mode, referred to herein as the "default" mode of operation, occurs where an electronic device is not actively being used by a user. Instead, when in the default mode of operation, one or more processors of the device are using the proximity sensor components to detect a user coming near and/or holding the device. Once this contact or proximately location is detected, the processors of the device transition to an "active" mode of operation. In the active mode of operation, the processors are actively operating the device, including the operating system environment, applications, and other features described above with reference to FIG. 1.

Thus, illustrating by example, when a user is not using a device, the device may be in a sleep or low power mode in the default mode of operation. The processors employ the proximity sensor components to actively seek and determine when a person comes near or grasps the device. Where the device is a smart phone, the smart phone may be OFF. When a user desires to make a telephone call, the user moves a hand to grab the device. The proximity sensor components detect this and cause the device to transition to the active mode of operation where the telephone application goes active and the user places a call.

In one or more embodiments, advantages can be obtained by driving the proximity sensor components differently in the default mode of operation than when in the active mode of operation. For instance, in one embodiment the one or more processors of the device are to drive a first proximity signal component at a higher power than another proximity signal component. Thus, a first signal emitter can be driven at a higher power than a second signal emitter when the portable electronic device is in a default mode of operation. This allows a centrally disposed signal receiver to detect objects from reflections from the first signal emitter at farther distances than from the second signal emitter. An object may be detected, for example, when it is three inches from the device from reflections from the first signal emitter. By contrast, the object may be detected at only one inch from reflections from the second signal emitter.

One advantage offered by this "different power" scheme is that of confirmation. In one or more embodiments, proximity is not verified until reflected signals are received from two emitters. Thus, by driving the signal emitters at different powers, proximity detection can be determined by reflections from the higher power emitter, while confirmation can be determined by reflections from the lower power emitter (each detected at different range from device). Advantageously, this works to reduce false tripping of the proximity sensor components. As will be explained below, in some applications the two powers can also be the same instead of one higher than the other.

As noted above, when the device is in the active mode of operation, in one or more embodiments a set of proximity sensor components can be used as a user input device. Accordingly, in one or more embodiments, the processors of the device can drive the emitters at a common power level when in the active mode of operation. Since a user's finger may be adjacent (or very close) to a surface of the electronic device, in one or more embodiments the common power level in the active mode of operation is less than or equal to the power level of the second emitter in the default mode of operation. This advantageous operating mode will be described below with reference to FIGS. 7-8.

Figure 7:
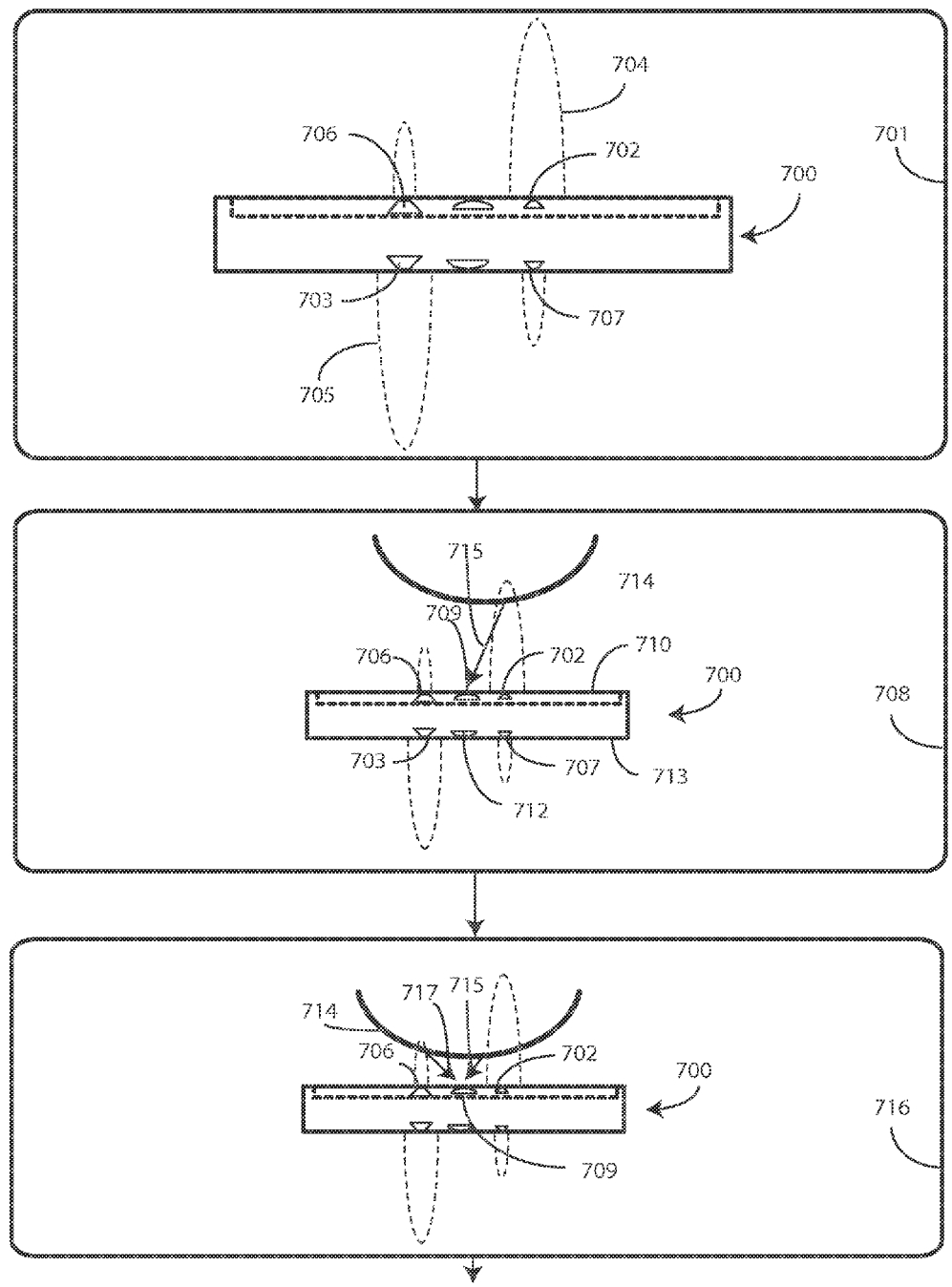
FIG. 7 illustrates steps of a method employing one explanatory portable electronic device in accordance with one or more embodiments of the disclosure.

Beginning with FIG. 7, at step 701 an electronic device 700 is in a default mode of operation. In this illustrative embodiment, one or more processors of the electronic device 700 are to drive the first signal emitter 702,703 of each proximity sensor set at a higher power 704,705 than the second signal emitter 706,707 of each proximity sensor set.

At step 708, the processors are to determine, with at least three proximity sensors, two being signal emitters 702,706 and one being a signal receiver 709, disposed along a first major face 710 to define a line arranged diagonal relative to a side 711 of the electronic device 700 and at least three additional proximity sensors disposed along a second major face 713 to define another line arranged diagonal relative to the side 711 of the electronic device, a proximity of an object 714 to one of the first major face 710 or the second major face 713. In this step 708, the object 714 is approaching from the first major face 710.

Since the processors are driving the first signal emitter 702,703 of each proximity sensor set at a higher power 704,705 than the second signal emitter 706,707 of each proximity sensor set, a reflected signal 715 is first received from the signal emitter 702. The processors thus determine an initial contact by receiving a reflected signal 715 from only one of two proximity sensors that are signal emitters 702,703 in this example.

At step 716, the object 714 has moved close enough for a second reflected signal 717 to be received from the second signal emitter 706. The processors thus confirm contact by receiving both the reflected signal 717 from the second signal emitter 706 and the reflected signal 715 from the first signal emitter 702. The processors thus transition from the default mode of operation to the active mode of operation, in this embodiment, when the signal receiver 709 receives proximity signals from both the first signal emitter 702 and the second signal emitter 706. As noted above, in one embodiment the processors to determine to which side of the electronic device 700 the object 714 is proximately located by comparing a first proximity signal, i.e., reflected signal 715, of the at least three proximity sensor components with a second proximity signal, i.e., reflected signal 717, of the at least three additional proximity sensor components.

Figure 8:
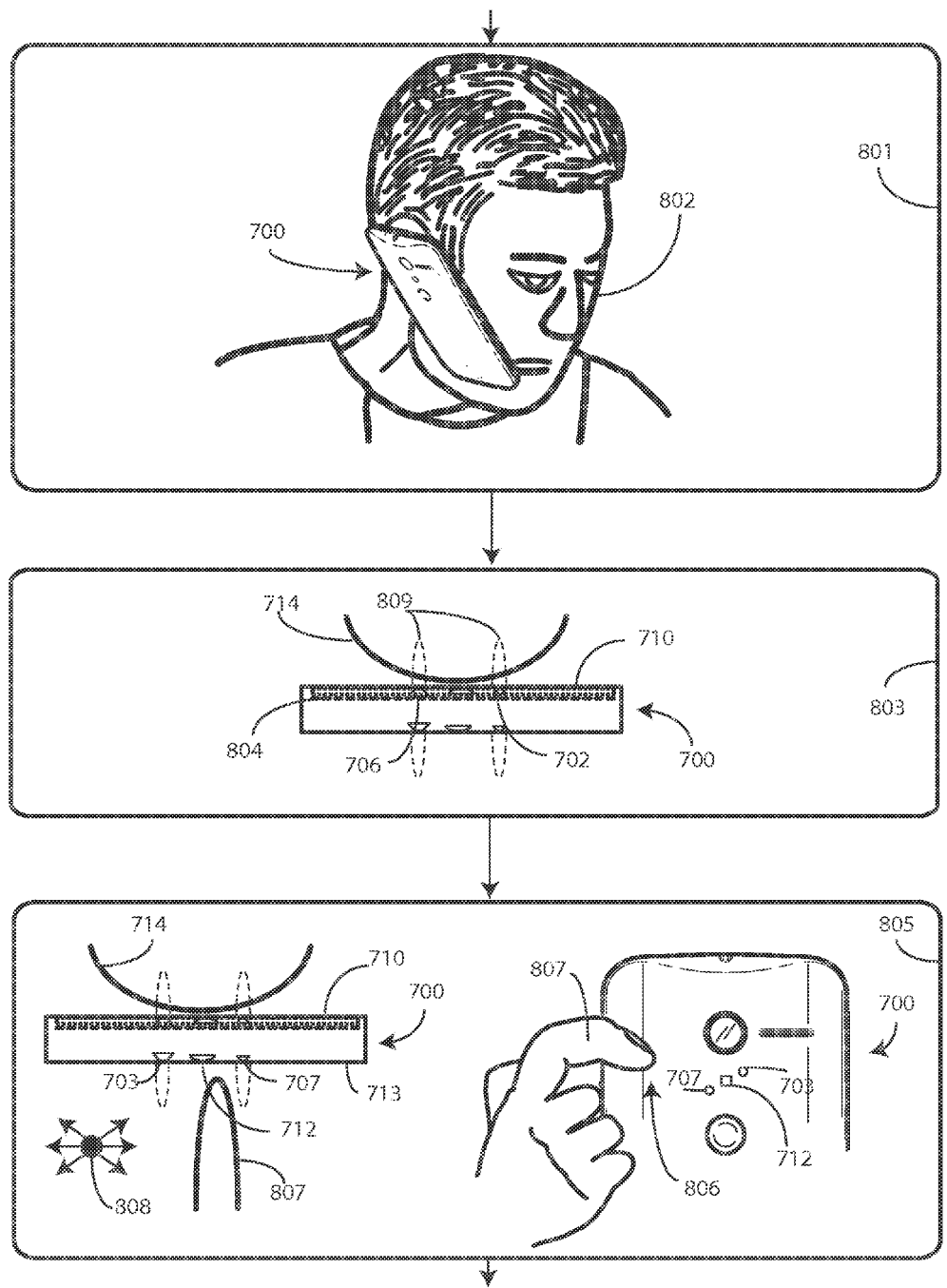
FIG. 8 illustrates steps of a method employing one explanatory portable electronic device in accordance with one or more embodiments of the disclosure.

Turning to FIG. 8, at step 801, it turns out that the object (714) was a user's face 802. Further, in this example, the first major face (710) turns out to be the side on which the primary display is disposed. As shown at step 801, the display of the electronic device 700 is pressed against the user's face 802. There is thus no reason to actively drive the display since the user cannot see it. Thus, as shown at step 803, in one embodiment when the object 714 is proximately located with the front major face 710, the processors turn OFF the display 804 or place it in a low-power mode. Also shown at step 803 is the fact that the processors are now driving the first signal emitter 702 and the second signal emitter 706 at a common power level 809 since the electronic device 700 is now in the active mode of operation.

Figure 9:
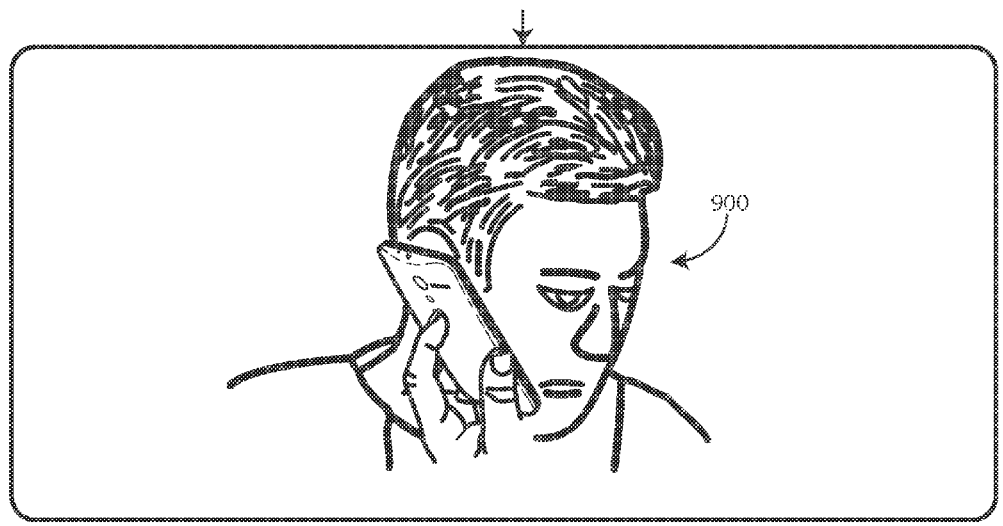
FIG. 9 illustrates steps of a method employing one explanatory portable electronic device in accordance with one or more embodiments of the disclosure.

At step 805, the electronic device 700 is receiving user input 806 from proximity sensors disposed along another of the first major face 710 and the second major face 713, which is the rear face in this example. Step 805 is occurring after the determining of proximity of the object 714 to the first major face 710 occurring in FIG. 7. The electronic device 700 is receiving this user input 806 from a user's finger 807 that is proximately located with the rear side of the device. The diagonal placement of the proximity sensor allows the user input 806 to be multi-dimensional gesture input 808. The user can move the finger 807 up and down, side to side, and even diagonally. If the user is making a phone call or is listening to music at step 801, this multi-dimensional gesture input 808 can be used to control volume of the call or music. Other functions will be obvious to those of ordinary skill in the art having the benefit of this disclosure. For example, if the user were looking at pictures, the multi-dimensional gesture input 808 may change pictures when it occurs right to left, but may change magnification when moving vertically, and so forth. Turning to FIG. 9, the user 900 is shown providing volume control on the rear side of the electronic device during a telephone call.

Figure 10:
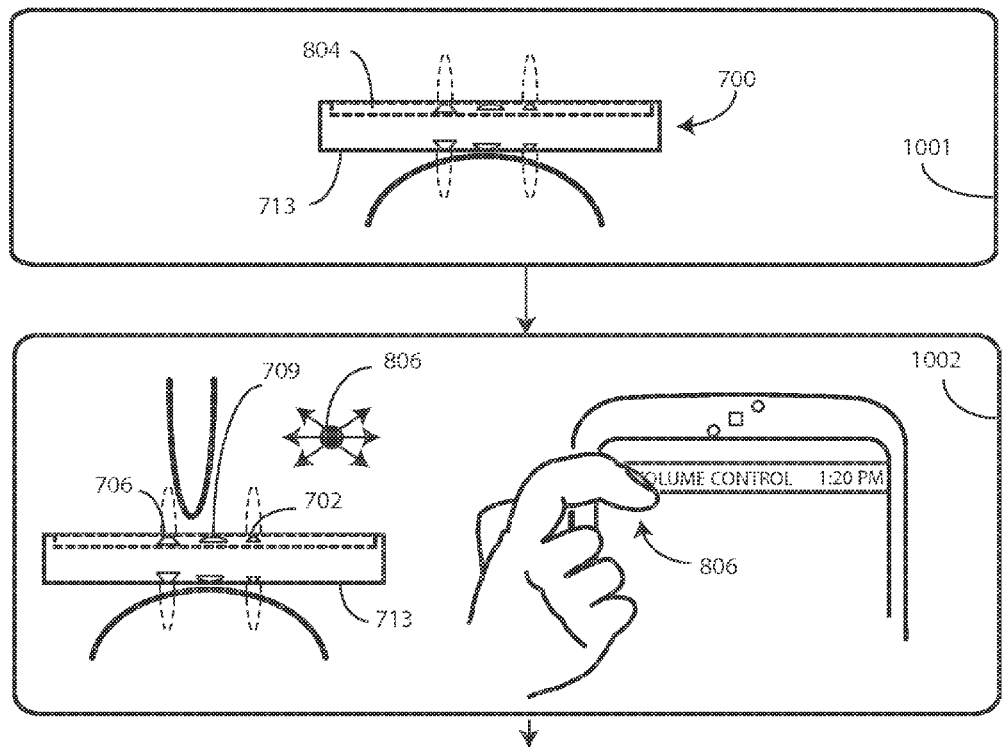
FIG. 10 illustrates steps of a method employing one explanatory portable electronic device in accordance with one or more embodiments of the disclosure.

FIG. 10 illustrates how the electronic device 700 can be turned over. The user (900) can make the same telephone call described above with reference to FIG. 9 by holding the rear side of the electronic device to his face as well. This transforms the electronic device 700 into a "multi-sided use capability device."

As shown at step 1001, the object 714 is now approaching from the second side 713 of the electronic device 700. Moreover, the object 714 has moved close enough for two reflected signals to confirm that the detected proximity is real. The processors thus transition from the default mode of operation to the active mode of operation. If the object (714) is the user's face (802), since the face is not adjacent to the front side, i.e., the display side, of the device, there may be a need to leave the display 804 ON. If so, as shown at step 1001, in one embodiment when the object 714 is proximately located with the second major face 713, the processors turn/leave ON the display 804. In one embodiment, the range of the back sensor used for control input is reduced down to touch or the processor adjust algorithm to enable touch operation in physical contact with sensor to prevent saturating the sensor when touched At step 1002, the electronic device 700 is receiving user input 806 from proximity sensors disposed along another of the first major face 710 and the second major face 713, which is the rear face in this example. Step 805 is occurring after the determining of proximity of the object 714 to the first major face 710 occurring in FIG. 7. The electronic device 700 is receiving this user input 806 from a user's finger 807 that is proximately located with the front side of the electronic device 700.

By comparing FIG. 10 with that of FIGS. 7-8, one can clearly see how the user can use the electronic device 700 from either side. When the object 714 is proximately located with the front major face, the processors receive user input from the proximity sensor components disposed along the rear face. By contrast, when the object 714 is proximately located with the rear major face, the processors receive user input from the at least three proximity sensors on the front face. This dual-sided functionality is not possible with prior art devices.

Figure 11:
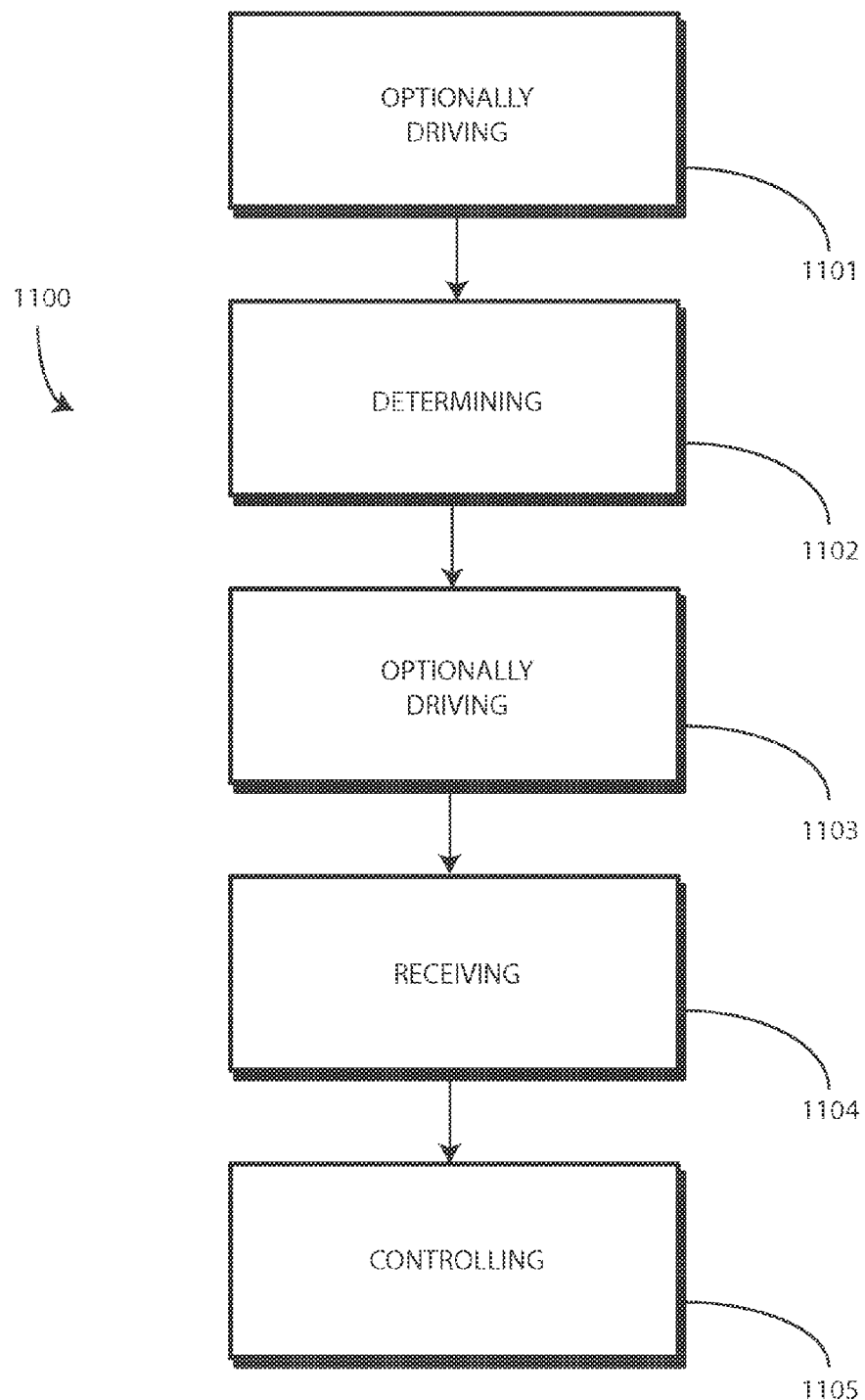
FIG. 11 illustrates a method in accordance with one or more embodiments of the disclosure.

Turning now to FIG. 11, illustrated therein is another a method 1101 for a portable electronic device configured in accordance with one or more embodiments of the disclosure. The method is suited for electronic devices having least at three proximity sensors disposed along a first major face to define a line arranged diagonal relative to a side of the portable electronic device and at least three additional proximity sensors disposed along a second major face to define another line arranged diagonal relative to the side of the portable electronic device.

At step 1101, the method optionally drives at least two of the three proximity sensors at different power levels. As noted above, this can help to prevent false tripping. In one or more embodiments, this optional driving at step 1101 occurs prior to any determination of proximity of objects to the device. At step 1102, the method determines proximity of an object to one of the first major face or the second major face of the electronic device. In one embodiment, steps 1101,1102 occur while the electronic device is in the default mode of operation.

At step 1103, the method 1108 transitions the electronic device to an active mode of operation. Accordingly, this step 1103 can optionally include driving at least two of the three proximity sensors at a common power level. In one or more embodiments, step 1103 occurs after the determining occurring at step 1102.

At step 1104, the method 1100 receives user input from proximity sensors disposed along another of the first major face and the second major face. In one embodiment, step 1104 occurs after the determining occurring at step 1102. Thus, if the object is adjacent to the front side of the electronic device, user input can be received from the rear side of the device and vice versa. In one embodiment, the receiving of step 1104 comprises detecting multi-dimensional user input with the proximity sensors disposed along the opposite side of the electronic device to which the object detected at step 1102 is located. At step 1105, the method 1110 controls a function of the device in response to the user input received at step 1104. Examples of the function include the volume of an audio output, which image is shown on a display, the magnification of the image, the zoom level, and so forth.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A portable electronic device, comprising:
a housing having a front major face, a rear major face, a first side edge, and a second side edge;
a display disposed along the front major face;
one or more processors operable with the display;
at least three proximity sensor components, operable with the one or more processors, the at least three proximity sensor components comprising a first signal emitter configured to operate at a first power level, a second signal emitter configured to operate at a second power level lower than the first power level and greater than zero in a default mode, and a signal receiver, wherein the at least three proximity sensor components are disposed along the front major face and arranged to define a line, the line diagonal to one or more of the first side edge and the second side edge;
at least three additional proximity sensor components, operable with the one or more processors, the at least three additional proximity sensor components disposed along the rear major face and arranged to define another line, the another line diagonal to one or more of the first side edge and the second side edge.

2. The portable electronic device of claim 1, the at least three additional proximity sensor components comprising a first signal receiver, a second signal receiver, and a signal emitter, wherein the signal emitter is disposed between the first signal receiver and the second signal receiver.

3. The portable electronic device of claim 1, the one or more processors to drive the first signal emitter and the second signal emitter at a common power level when in an active mode of operation.

4. The portable electronic device of claim 3, the one or more processors to transition from the default mode of operation to the active mode of operation when the signal receiver receives proximity signals from both the first signal emitter and the second signal emitter.

5. The portable electronic device of claim 1, the one or more processors to determine to which side of the portable electronic device an object is proximately located by comparing a first proximity signal of the at least three proximity sensor components with a second proximity signal of the at least three additional proximity sensor components.

6. The portable electronic device of claim 5, wherein when the object is proximately located with the front major face, the one or more processors turn OFF the display.

7. The portable electronic device of claim 5, wherein when the object is proximately located with the front major face, the one or more processors receive user input from the at least three additional proximity sensor components.

8. The portable electronic device of claim 7, the user input comprising volume control.

9. The portable electronic device of claim 7, the user input comprising multi-dimensional gesture input.

10. The portable electronic device of claim 5, wherein when the object is proximately located with the front major face, the one or more processors receive user input from the at least three proximity sensor components.

11. The portable electronic device of claim 1, the at least three additional proximity sensor components comprising a first component, a second component, and a third component, the second component disposed between the first component and the third component, the second component a different component type from the first component and the third component.

12. The portable electronic device of claim 11, the first component and the third component one of a signal emitter or a signal receiver, the second component another of the signal emitter or the signal receiver.

13. The portable electronic device of claim 1, one or both of the line or the another line arranged about forty-five degrees relative to the one or more of the first side edge and the second side edge.

14. The portable electronic device of claim 1, wherein proximity detection is determined by detecting, by the signal receiver, a first reflection of a first signal from the first signal emitter, and wherein confirmation of the proximity detection is determined by detecting, by the signal receiver, a second reflection of a second signal from the second signal emitter.

15. A method in a portable electronic device, the method comprising:
determining, with at least three proximity sensors disposed along a first major face to define a line arranged diagonal relative to a side of the portable electronic device and at least three additional proximity sensors disposed along a second major face to define another line arranged diagonal relative to the side of the portable electronic device, a proximity of an object to one of the first major face or the second major face, wherein the at least three proximity sensors comprise a first signal emitter, a second signal emitter and a signal receiver, wherein the first signal emitter operates at a first power level and the second signal emitter operates at a second power level lower than the first power level and greater than zero in a default mode; and
receiving user input from proximity sensors disposed along another of the first major face and the second major face after determining the proximity of the object to the one of the first major face or the second major face.

16. The method of claim 15, the receiving comprising detecting multi-dimensional user input with the proximity sensors disposed along the another of the first major face and the second major face.

17. The method of claim 15, further comprising controlling, with one or more processors of the portable electronic device, a volume of an audio output of the portable electronic device.

18. The method of claim 15, further comprising turning OFF a display of the portable electronic device.

19. The method of claim 15, further comprising driving at least two of the at least three proximity sensors at different power levels prior to the determining and driving the at least two of the at least three proximity sensors at a common power level after the determining.

20. The method of claim 15, wherein proximity detection is determined by detecting, by the signal receiver, a first reflection of a first signal from the first signal emitter, and wherein confirmation of the proximity detection is determined by detecting, by the signal receiver, a second reflection of a second signal from the second signal emitter.

* * * * *